United States Patent
O'Connor et al.

(10) Patent No.: US 9,503,680 B1
(45) Date of Patent: Nov. 22, 2016

(54) SYSTEM FOR OPTIMIZING THE MONETIZATION OF OUTGOING VIDEO SESSIONS OF A CONTACT CENTER

(71) Applicant: Avaya Inc., Basking Ridge, NJ (US)

(72) Inventors: Neil O'Connor, Galway (IE); Liam Loftus, Galway (IE); Paul D'Arcy, Galway (IE); Paul Kelly, Galway (IE); Sean Burke, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/757,616

(22) Filed: Dec. 23, 2015

(51) Int. Cl.
*H04M 3/00* (2006.01)
*H04M 5/00* (2006.01)
*H04N 7/14* (2006.01)
*H04M 3/51* (2006.01)
*H04L 29/06* (2006.01)
*H04M 3/523* (2006.01)

(52) U.S. Cl.
CPC ............ *H04N 7/141* (2013.01); *H04L 65/602* (2013.01); *H04L 65/608* (2013.01); *H04M 3/5183* (2013.01); *H04M 3/5231* (2013.01)

(58) Field of Classification Search
CPC .................... H04M 3/42195; H04M 2203/40; H04M 3/51; H04M 3/5231
USPC ............ 379/265.09, 266.07, 265.05, 265.11, 379/210.01
See application file for complete search history.

(56) References Cited

U.S. PATENT DOCUMENTS

| | | | |
|---|---|---|---|
| 7,492,386 B2* | 2/2009 | Nichols ............. | H04M 1/72544 348/14.07 |
| 8,769,119 B2* | 7/2014 | Michaeli ................. | H04L 67/34 709/227 |
| 8,863,174 B2 | 10/2014 | Neil et al. | |
| 9,167,085 B2* | 10/2015 | Waxman ........... | H04M 3/42195 |
| 2015/0113563 A1 | 4/2015 | Woods et al. | |
| 2015/0143415 A1 | 5/2015 | Noll et al. | |

OTHER PUBLICATIONS

Avaya Inc.; "Avaya One X Agent Overview"; Oct. 20, 2015; <https://downloads.avaya.com/css/P8/documents/100069882>.
Rubel, Steve; "Picture-in-Picture Advertising"; Oct. 20, 2015; <http://www.negocios.biz/business/opportunities/business/picture-in-picture_advertising/>.

* cited by examiner

*Primary Examiner* — Thjuan K Addy (57) ABSTRACT

Providing a video session from an agent of a contact center includes initiating by a contact center server an interactive video session to a customer computer, the interactive video session comprising a first video stream transmitted to the customer computer and the first video stream having an image size. The interactive video session also includes inserting an agent video portion within the first video stream, the agent video portion occupying a first part of the image size; providing an agent computer with a script related to a subject of the interactive video session; and inserting an automation within the first video stream; the automation occupying a second part of the image size. Input is received from the customer computer interacting with the automation; and based on the input, the script provided to the agent computer is modified.

20 Claims, 8 Drawing Sheets

SYSTEM FOR OPTIMIZING THE MONETIZATION OF OUTGOING VIDEO SESSIONS OF A CONTACT CENTER

BACKGROUND

The present disclosure relates generally to operation of a contact center, and, more particularly, to video sessions from the contact center.

Contact centers can involve providing customer service for inbound calls and for providing customer service by having agents place outbound calls. Such outbound calls can include a callback resulting from an earlier inbound call or incoming contact from a customer. Such outbound calls can, for example, also be a scheduled callback or can be a regularly occurring expert consultation. The callback or expert consultation has been traditionally limited to voice-only communication but the inclusion of video in such callbacks has been increasing. The video communication can be one-way in that the customer sees a video of the contact center agent but the agent does not necessarily receive a video feed from the customer. The video communication can also be two-way in that the contact center agent receives a video feed from the customer and the customer receives a video feed of the agent.

One recent technology that provides two way video communication without requiring equipment or devices other than what is normally part of a consumer personal computer is known as WebRTC. WebRTC allows two appropriately enabled web browsers to participate in two-way multimedia communications.

BRIEF SUMMARY

One aspect of the present disclosure relates to a method of providing a video session from an agent of a contact center that includes initiating, by a contact center computer, an interactive video session to a customer computer, the interactive video session comprising a first video stream transmitted to the customer computer and the first video stream having an image size. The method also includes inserting, by the contact center computer, an agent video portion within the first video stream, the agent video portion occupying a first part of the image size; providing, by the contact center computer, an agent computer with a script related to a subject of the interactive video session; and inserting, by the contact center computer, an automation within the first video stream, the automation occupying a second part of the image size. This method also includes receiving, by the contact center computer, input from the customer computer interacting with the automation; and then, based on the input, modifying, by the contact center computer, the script provided to the agent computer.

Another aspect of the present disclosure relates to a contact center system for providing a video session from an agent computer within the contact center. This system includes a contact system server comprising a video stream mixer; a computer readable storage medium storing executable instructions; and a processor in communication with the computer readable storage medium. In particular, thee processor when executing the executable instructions: a) initiates an interactive video session to a customer computer, the interactive video session comprising a first video stream transmitted to the customer computer and the first video stream having an image size; b) inserts via the video stream mixer an agent video portion within the first video stream, the agent video portion occupying a first part of the image size; c) provides an agent computer with a script related to a subject of the interactive video session; d) inserts via the video stream mixer an automation within the first video stream; the automation occupying a second part of the image size; e) receives input from the customer computer interacting with the automation; and f) modifies the script provided to the agent computer based on the input.

Yet another aspect of the present disclosure relates to a contact center system for providing a video session from an agent computer within the contact center. The system includes a first storage device storing a first database comprising a plurality of profiles, each profile associated with a respective customer computer; and a second storage device storing a second database comprising a plurality of automations; each automation comprising an interactive video experience embeddable into a video stream. The system also includes an agent computer, a contact center server, and a network medium interconnecting the agent computer, the contact center server, the first storage device and the second storage device. The agent computer includes a video stream transmitter that transmits an agent video stream; and a display that displays an agent script. The contact system server includes a video stream mixer; a computer readable storage medium storing executable instructions; and a processor in communication with the computer readable storage medium. In particular, the processor when executing the executable instructions: a) receives the agent video stream from the agent computer; b) initiates an interactive video session to a customer computer, the interactive video session comprising a first video stream transmitted to the customer computer and the first video stream having an image size; c) inserts via the video stream mixing device an agent video portion within the first video stream, the agent video portion comprising the received agent video stream and the agent video portion occupying a first part of the image size; d) transmits to the agent computer the agent script, wherein contents of the agent script are related to a subject of the interactive video session; e) determines a particular one profile from the first database associated with the customer computer; f) selects an automation from the second database based on the particular one profile; g) inserts via the video stream mixing device the automation within the first video stream; the automation occupying a second part of the image size; h) receives input from the customer computer interacting with the automation; and i) modifies the agent script transmitted to the agent computer based on the input.

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The present disclosure will be illustrated below in conjunction with an exemplary communication system. Although well suited for use with, e.g., a system having an ACD or other similar contact processing switch, the present disclosure is not limited to any particular type of communication system switch or configuration of system elements. Those skilled in the art will recognize that the disclosed techniques may be used in any communication application in which it is desirable to provide improved contact processing.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage' medium. When the computer-readable media is configured as a database, it is to be understood that the database may be any type of database, such as relational, hierarchical, object-oriented, and/or the like. Accordingly, the present disclosure is considered to include a tangible storage medium or distribution medium and prior art-recognized equivalents and successor media, in which the software implementations of the present disclosure are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

Embodiments of the present disclosure are described below with respect of an interactive video session that is a callback that was requested by a customer. However, the interactive video session described herein may be beneficial in other scenarios as well. One example scenario is for when a customer has agreed to an offer of a free consultation from a financial, or similar institution. Another example can be when a customer engages in regular remote face-to-face sessions with an expert advisor at a pre-arranged time.

Figure 1:
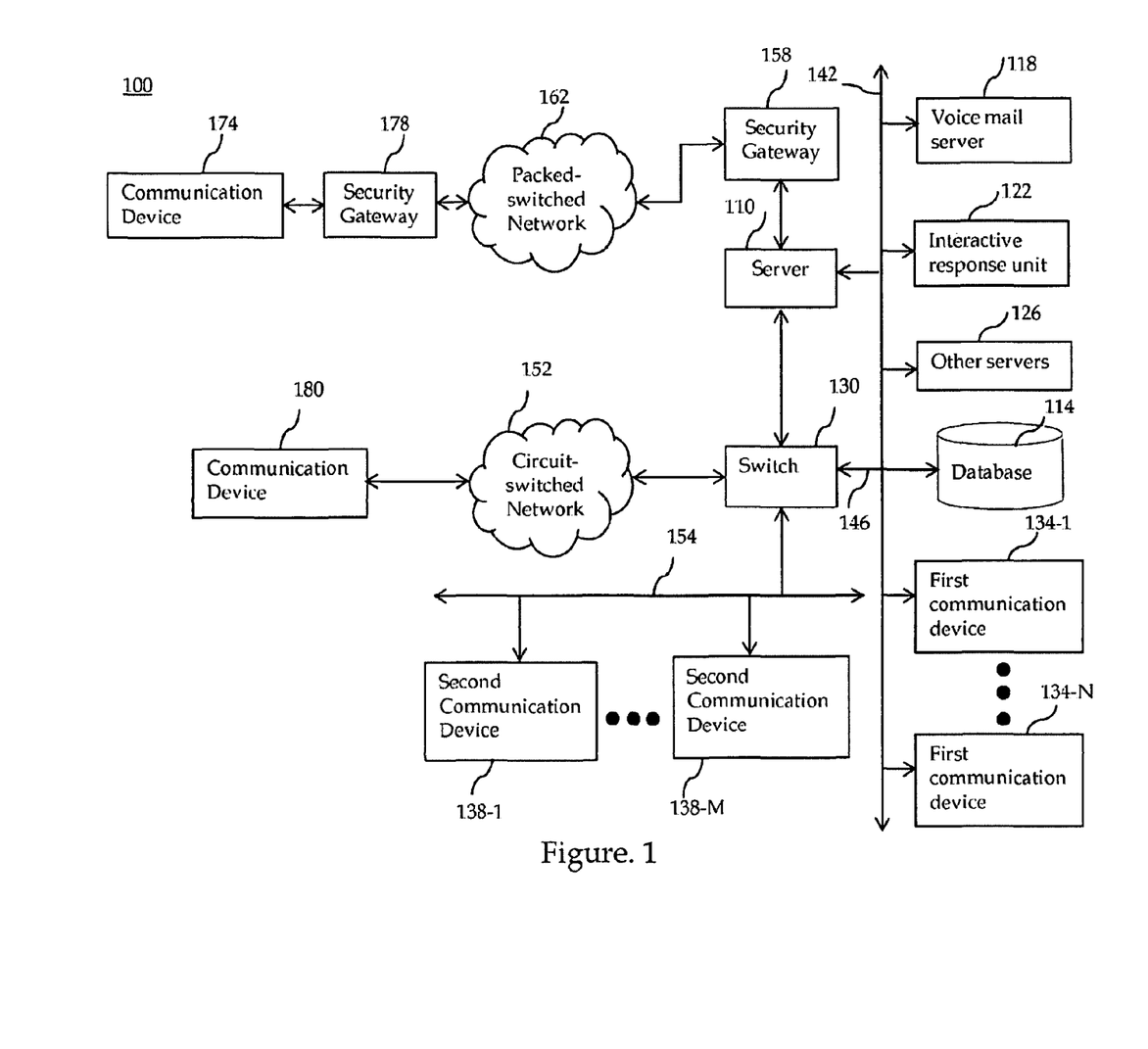
FIG. 1 illustrates an example contact center architecture in accordance with the principles of the present disclosure.

FIG. 1 shows a contact center 100 that comprises a server 110, a set of data stores or databases 114 containing media streams of call conversation, and a plurality of servers, namely a voice mail server 118, an Interactive Response Unit (e.g., IVR) 122, a web server 124 and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers may be connected via optional communication lines 146 to the switch 130. As will be appreciated, the other servers 126 may also include a scanner (which is normally not connected to the switch 130 or server 110), VoIP software, video call software, voice messaging software, an IP voice server, a fax server, an email server, and the like. The switch 130 is connected via a plurality of trunks 150 to the Public Switch Telephone Network or PSTN 152 and via link(s) 154 to the second communication devices 138-1 to M. A security gateway 158 is positioned between the server 110 and a packet-switched network 162 to process communications passing between the server 110 and the packet-switched network 162.

Although some embodiments are discussed with reference to client-server architecture, it is to be understood that the principles of the present disclosure apply to other network architectures. For example, the present disclosure applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the disclosure does not require the presence of packet- or circuit-switched networks.

Web Real-Time Communications (WebRTC) represents an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in WebRTC: APIs and RTCWEB Protocols of the HTML5 Real-Time Web," by Alan B. Johnston and Daniel C. Burnett, $2^{nd}$ Edition (2013 Digital Codex LLC), which is incorporated herein in its entirety by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www.ietf.org.

To establish a WebRTC interactive flow (e.g., a real-time video, audio, and/or data exchange), two WebRTC clients may retrieve WebRTC-enabled web applications, such as HTML5/JavaScript web applications, from a WebRTC application server. Through the web applications, the two WebRTC clients then engage in dialogue for initiating a peer connection over which the WebRTC interactive flow will pass. The initiation dialogue may include a media negotiation used to reach an agreement on parameters that define characteristics of the WebRTC interactive flow. Once the initiation dialogue is complete, the WebRTC clients may then establish a direct peer connection with one another, and may begin an exchange of media and/or data packets transporting real-time communications. The peer connection between the WebRTC clients typically employs the Secure Real-time Transport Protocol (SRTP) to transport real-time media flows, and may utilize various other protocols for real-time data interchange.

The WebRTC clients may be connected using a "full mesh" topology, in which each WebRTC client participating in the real-time communications establishes a peer connection with every other participating WebRTC client. In some circumstances, though, a full mesh topology may be prohibitively expensive in terms of network bandwidth and/or computing resources. As an alternative to a full mesh topology, each of the WebRTC clients may connect to a central media server, which mixes and distributes the WebRTC interactive flows to the participating WebRTC clients. The media server may also provide various types of media processing functionality (e.g., inserting announcements into, recording, switching, and/or redirecting WebRTC interactive flows, as non-limiting examples) that are accessible by the WebRTC application.

Figure 2:
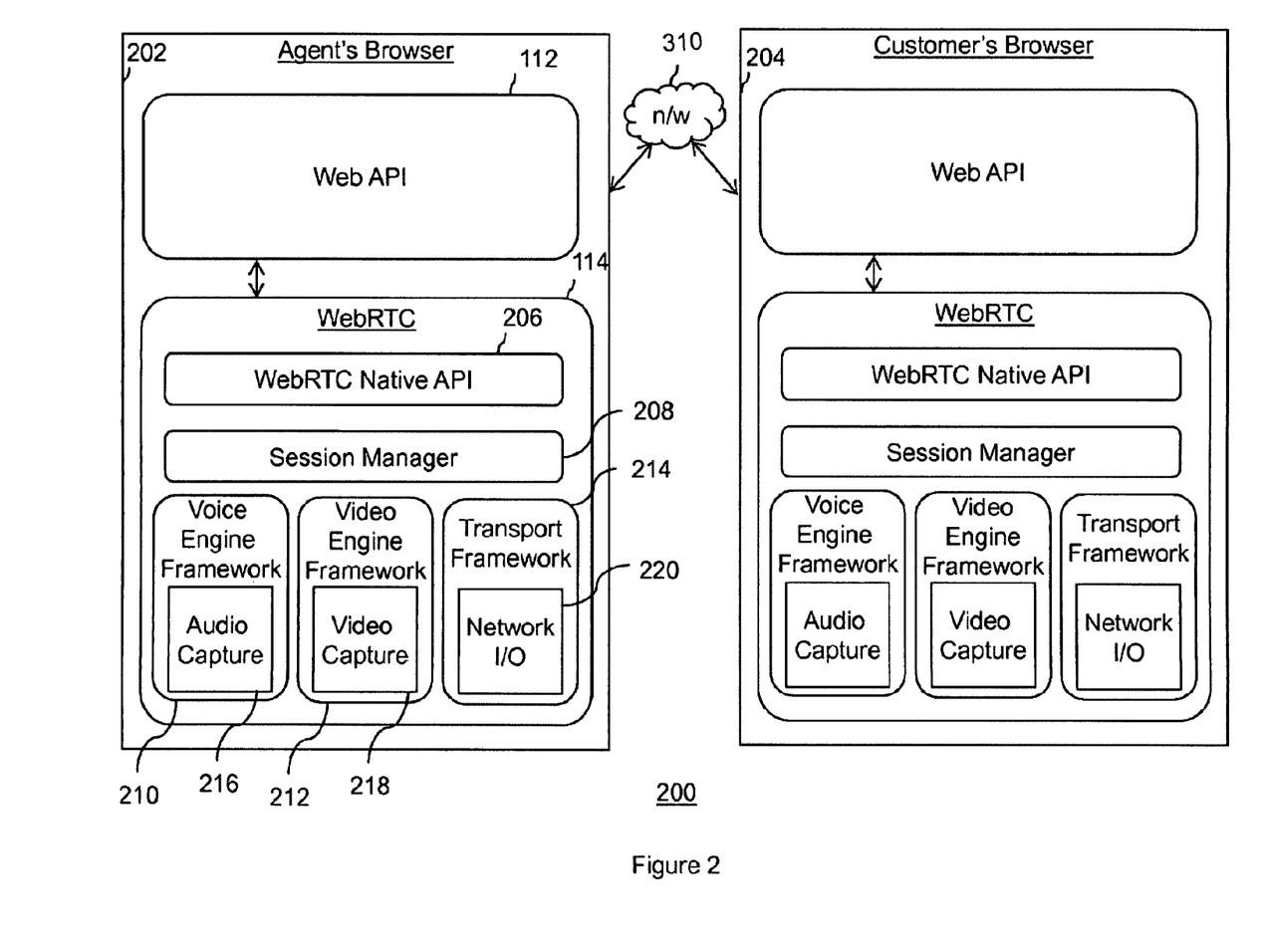
FIG. 2 and FIG. 3 illustrate example communication architectures between a customer and an agent in accordance with the principles of the present disclosure.

FIG. 2 depicts an architecture 200 that is used to enable an agent of the contact center 100 to communicate with a targeted entity by using WebRTC technology. As shown, web browser 202 of an agent (hereinafter may be referred to as 'agent's browser' 202) of the contact center 100 (not shown in FIG. 2) is in communication with another web browser 204 of a customer (hereinafter may be referred to as 'customer's browser' 204) via the network 310. In an embodiment, the agent's browser 202 and the customer's browser 204 may be any web browser that supports the WebRTC technology. Further, the agent and the customer must have a device that supports WebRTC enabled browsers. Examples of such device may include, but are not restricted to, a personal computer, a mobile phone, a smart phone, a personal digital assistant (PDA), a tablet computer, a laptop, and the like.

Further, the agent's browser 202 may be enabled to communicate with the customer's browser 204 over the network 106 by the WebRTC layer 114 with the help of web API 112. Further, the WebRTC layer 114 includes WebRTC Native API layer 206, which is used for peer connections and helps in implementation of the proposals received from the web API 112. Further, the WebRTC layer 114 includes a session manager layer 208, which is used to enable real time protocols for establishing and managing connections across the network 310.

The WebRTC layer 114 includes three types of frameworks such as, voice engine framework 210, video engine framework 212, and transport framework 214. The voice engine framework 210 is used for the audio media chain, from sound card to the network 106. It also helps in cancelling acoustic echo and in reduction of noise. The voice engine framework 210 further includes an optional audio capture API 216 for recording audio communications.

Further, the video engine framework 212 is used for the video media chain, from camera of the device (not shown) having the agent's browser 202 to the network 106 and from the network 106 to display screen (not shown) of the device. It also helps in helps in concealing effects of video jitter and packet loss on overall video quality. Moreover, it also removes video noise from images captured by the camera. The video engine framework 212 further includes an optional video capture API 218 for recording video communications.

In addition, the transport framework 214 is used in peer to peer communication and its optional network I/O API 220 may facilitate management of inputs/outputs of the agent or customer over the network 106. This WebRTC architecture enables the agent's browser 202 to communicate with the customer's browser 204. In an embodiment, the customer's browser 204 may have a similar architecture as of the agent's browser 202.

Figure 3:
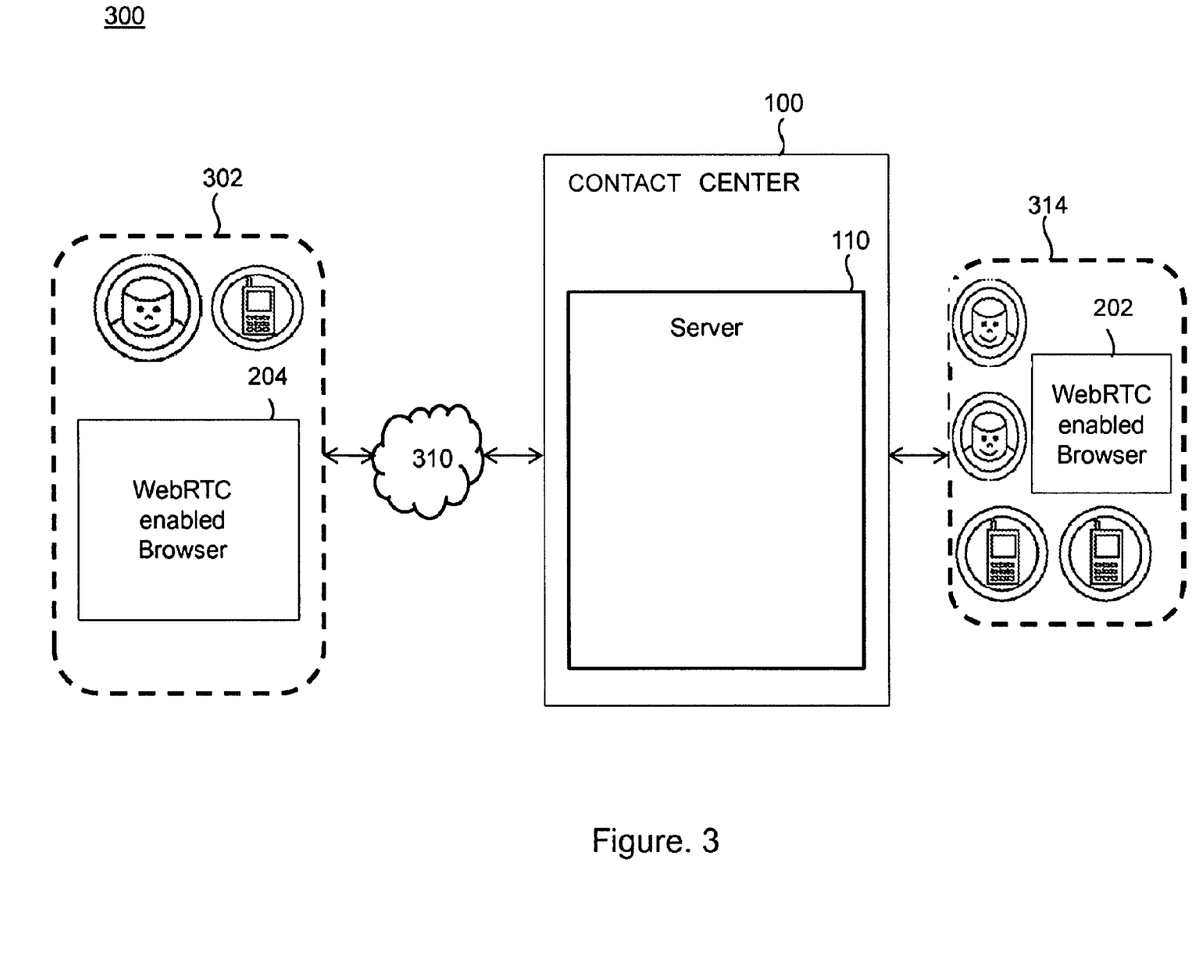

FIG. 3 illustrates a communication architecture 300 very similar to that of FIG. 2 but shows how the contact center 100 and the server 110 can be located between the agent's device 314 implementing the web browser 202 and the customer's device 203 implementing the web browser 204. As explained below, according to the architecture 300 of FIG. 3, allows the server 110 to receive a video feed from the agent's device 314 and then modify a resulting video feed that is transmitted to the customer's device 302.

When a call that is outgoing from the contact center 100 is answered by a prospective customer, the agent has limited opportunity to engage the customer's interest. In callback scenarios, the customer will generally wish to limit the time spent with the agent to the topic of the original inbound call. Despite the fact that that the vendor may have additional offers or products that might be of interest, these prospects can be lost due to the limited time allowed by the customer. Scheduled video callbacks and regular expert consultations via video are becoming more commonplace with the rise of disruptive video technologies such as WebRTC. As explained below, these disruptive technologies offer a means to more fully exploit the opportunity afforded by the limited time available when contact center agents make outgoing/scheduled callbacks.

In accordance with the principles of the present disclosure, the content of an outgoing video session of a contact center is augmented with specially modified visual treatments and automations in order to make concurrent suggestions to a customer that are alternate or complementary to the one being discussed by the agent, and uses information gleaned from the automations in real time to adjust the agent script.

Figure 4:
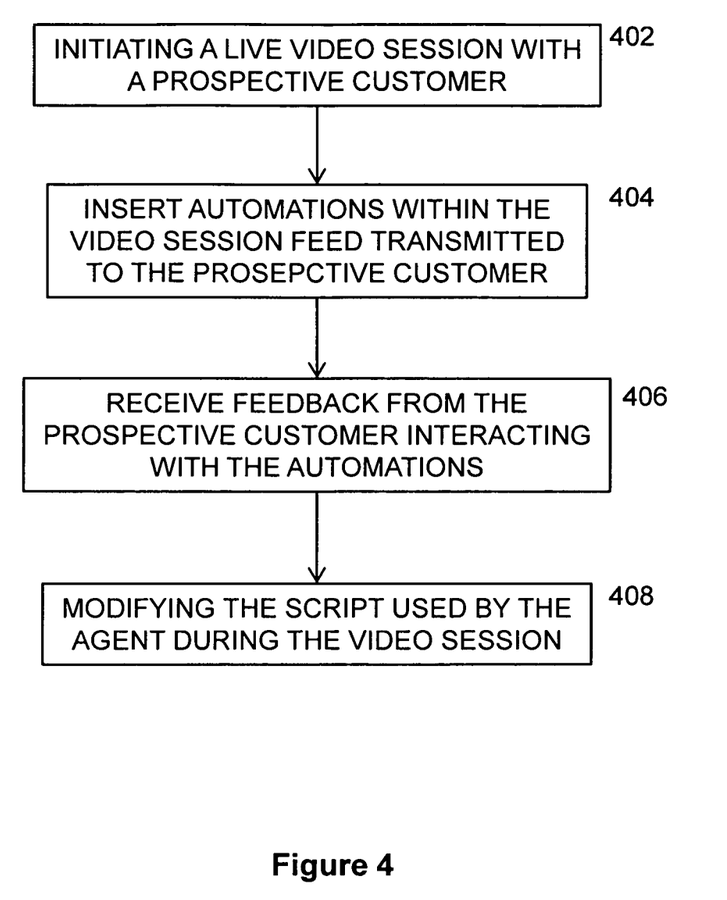
FIG. 4 and FIG. 5 are a flowcharts of an example algorithm for providing an interactive video session in accordance with the principles of the present disclosure.
Figure 5:
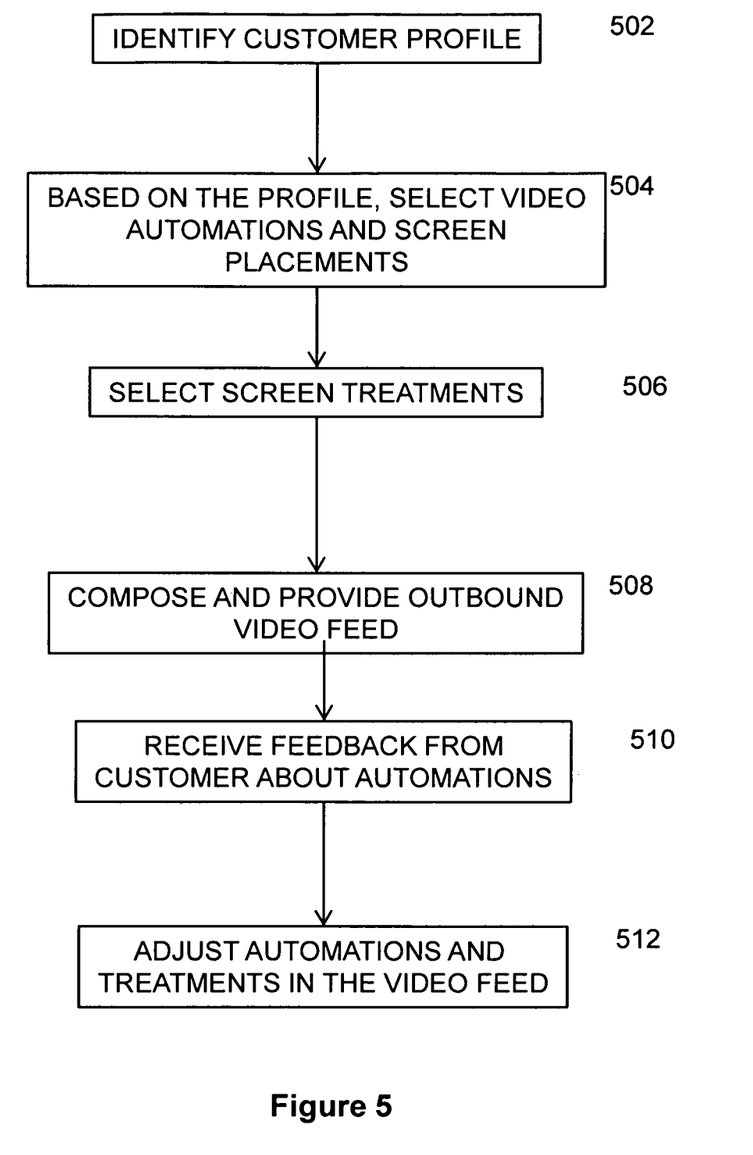

FIG. 4 and FIG. 5 are flowcharts of an example algorithm for providing an interactive video session in accordance with the principles of the present disclosure. In step 402, of the flowchart of FIG. 4, a live video session is initiated with a prospective customer. In particular, a contact center computer initiates the interactive video session with a computer of the prospective customer. As mentioned above, this video session may be a callback initiated by an agent in response to receiving an earlier request from the prospective customer. Thus, the interactive, or live, video session between two parties can include a video stream that transmitted by the agent (or contact center) to the customer. In particular, this video stream can include an image size.

A video composer, a video stream mixer, or other functionally equivalent software or device can insert an agent video portion within the first video stream. This portion of the video stream includes the video of the agent as the agent makes a presentation according to a script that an appropriate part of the contact center has provided the agent. The agent video portion occupies a first part of the entire image size of the video stream. The size of the agent video portion can be measured in terms of "percentage of the entire image size of the video stream". Thus, the agent video portion can occupy 20% of the video stream.

In step 404, the computer, video composer, or similar software module can insert an automation within the video stream; the automation occupying a second part of the image size. In step 404 more than one automation can be inserted into the video stream with each automation occupying a respective portion of the video stream. Similar to the agent video portion, a size of an automation can be measured as X % of the entire image size.

Treatments can also be inserted into the video stream as well. A treatment may provide a web site address, a toll-free number, textual information or similar types of visual information. An automation differs from a treatment in that the automation is constructed to elicit interactive feedback from the receiving customer. For example, the automation may provide a menu of items and ask whether the customer is more interested in hearing about one of the menu items as compared to the present subject of the agent's presentation. The automation can elicit textual input, mouse clicks, screen touches, numeric input from a mobile device keypad, etc. One of ordinary skill will recognize that as meant in the present disclosure an automation is a visual interface element, or an embeddable video experience, that is constructed to interact with the customer such that the interaction provides feedback from the customer computer to the contact center computer during the video session. The subject matter of an automation can be related to the subject matter of the agent's presentation, it can be ancillary to the agent's presentation, it can be complimentary to the agent's presentation, or it could be an alternative to the subject of the agent presentation.

In step 406, feedback from the customer's interaction with an automation is received by the contact center 100 such as by the server 110. Based on the received feedback, the server 110 of the contact center can modify, in step 408, the script that is being presently used by the agent. Thus, based on real time feedback from the customer, the agent is provided with a new, or modified, script that was changed based on the customer's feedback.

In some embodiments of the present disclosure, the video session can include a second stream so that the agent is presented with video of the customer while the agent is making their presentation.

The flowchart of FIG. 5 provides additional details for the method just described with respect to FIG. 4. In step 502, as part of initiating the video session, the server 110 identifies the customer being called. The server 110 can then extract a profile of that customer from a database of pre-stored profiles. In this manner, the extracted profile is a profile that is associated with the customer and the customer's computer. The profile may include demographic information such as gender, age, profession, education-level, etc. The extracted profile may also be based on earlier interactions between the customer and the contact center 100.

Based on the subject matter of the agent's presentation, one or more automations that are appropriate for the agent's presentation can be selected from a stored database of automations. The customer profile can also be used to select one or more automations as well. In step 504, the customer profile is used to determine the size of each automation and the placement of each automation. The customer profile may include explicit information about a preferred location and size of any automation or the server 110 can include an algorithm that determines automation size and placement based on one or more pieces of demographic information in the customer's profile. Thus, the video stream transmitted to the customer is customized for that customer based on the extracted profile. The server 110 can also select one or more session treatments, in step 506, based on the specific customer profile as well.

Accordingly, in step 508, the server 110 can compose a video feed, or video stream, that includes an agent portion, one or more automations, and treatments that are sized and located based on a customer profile associated with the recipient of the video stream. This customized video stream is then transmitted to the customer computer as an interactive video session that includes a presentation by an agent.

As mentioned with respect to FIG. 4, the customer, through the customer's computer, can interact with the automations such that feedback is generated and received by the contact center 100. In addition to that feedback, the customer can also provide feedback about the automations and their respective size such that the contact center 100 receives feedback, in step 510, that indicates the customer would like a) an automation moved, b) the agent video portion size increased (or decreased), c) an automation re-sized, or d) a treatment resized (or removed). Accordingly, in step 512, the module of the server 100 that is composing, or mixing, the video stream can adjust the automations and treatments during the interactive video session.

Figure 6A:
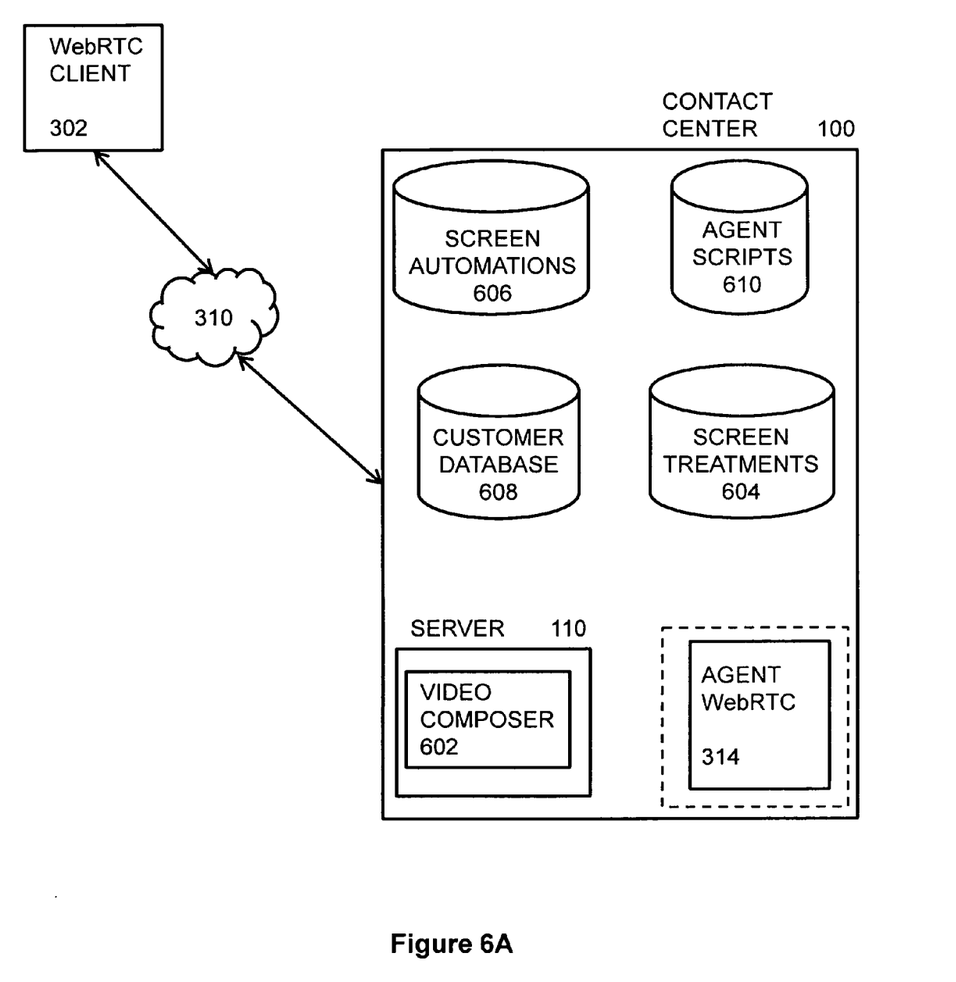
FIG. 6A and FIG. 6B are block level diagrams of contact center components in accordance with the principles of the present disclosure.
Figure 6B:
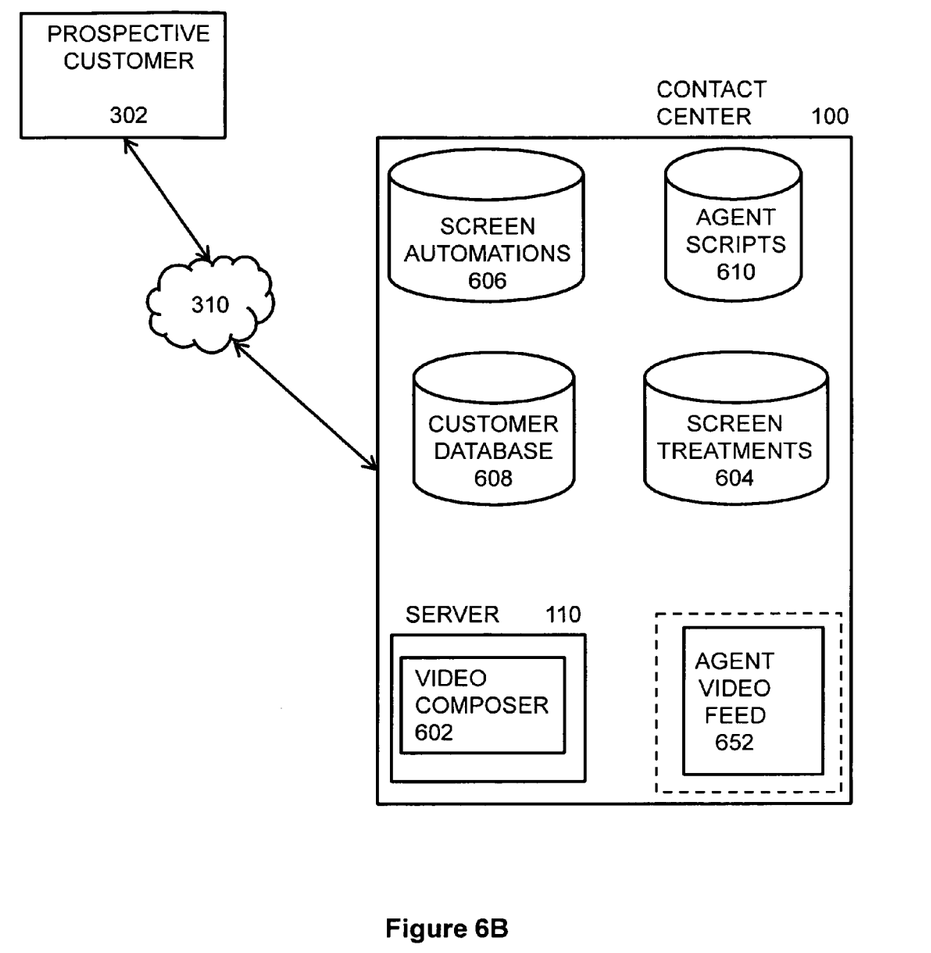

FIG. 6A and FIG. 6B are block level diagrams of contact center components in accordance with the principles of the present disclosure. Although not shown in FIGS. 6A and 6B, the functional blocks may be interconnected by one or more networks so that information can be transmitted/received between the different blocks. In FIG. 6A, the server 110 includes a video composer, video stream mixer, or other multimedia assembler that creates a video stream that is transmitted to the customer's device 302, which in one embodiment can include a WebRTC client. In the embodiment of FIG. 6A, the agent's device 314 also includes a WebRTC browser and provides the agent video portion of the to-be-assembled video stream transmitted to the customer. The server 110 also has access to a customer database 608 with profiles to be used for selecting, sizing, and locating automations in a video stream. The server 110 also can communicate with a database 610 that has various scripts for the agents of the contact center to use during presentations. Thus, the server 110 can select different scripts and provide them to the agent. or the agent computer, based on feedback received that is related to a customer's interaction with one or more automations inserted into the presentation's video stream.

The server 110 can also access a database 604 of different treatments and a database 606 of different automations. The video composer 602 of the server 110 can use the customer profile to select different screen treatments and automations and then determine, based on that profile, how to locate and size those treatments and automations within the video stream.

FIG. 6B is essentially the same architecture as FIG. 6A except for the agent video feed 652. In the embodiment of FIG. 6B, the agent may not necessarily have a WebRTC browser but may rely on other technology to capture and transmit the agent video portion that is assembled into the video stream transmitted to the prospective customer device 302. Furthermore, the customer device 302 may not necessarily be WebRTC enabled either.

Figure 7:
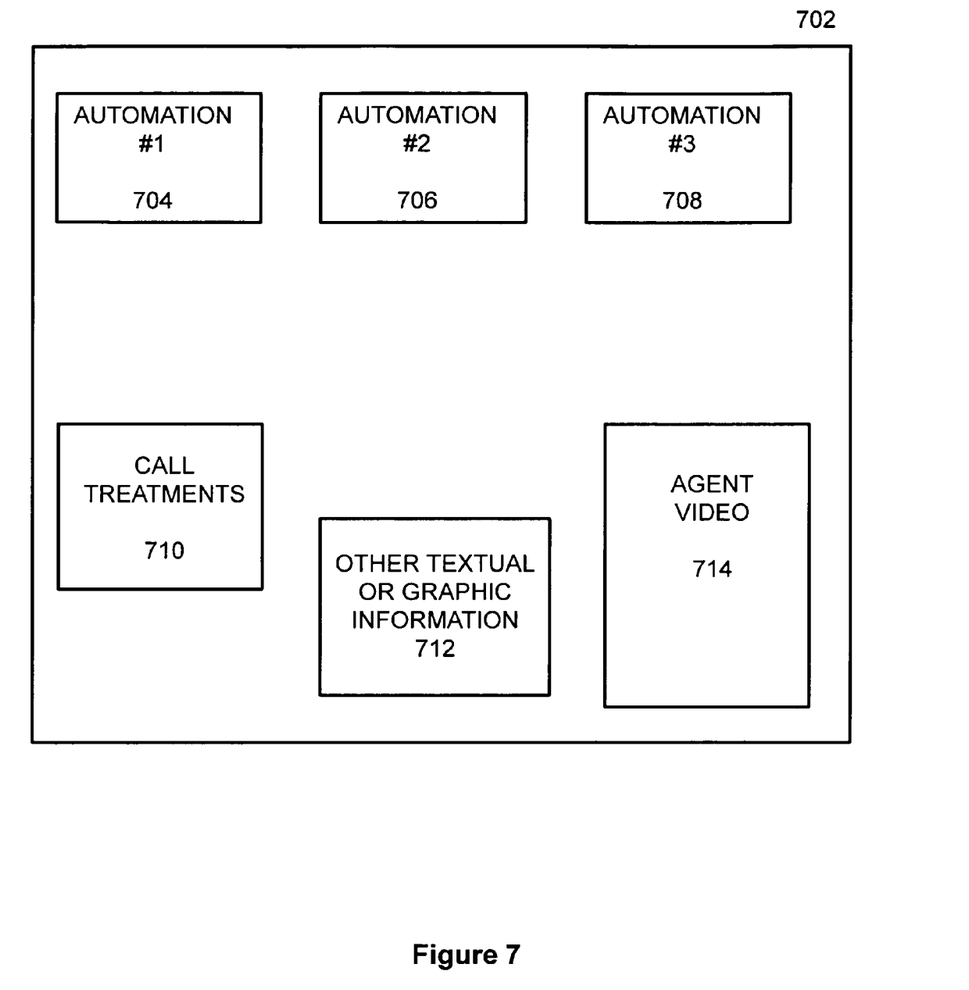
FIG. 7 illustrates a screenshot of an interactive video session from the perspective of the customer, in accordance with the principles of the present disclosure.

FIG. 7 illustrates a screenshot of an interactive video session from the perspective of the customer, in accordance with the principles of the present disclosure. Automations 704, 706 and 708 may be sized and placed within the image of the video stream in a variety of different ways. As mentioned above, according to the principles of the present disclosure, the location and sizes of the automations 704, 706, 708 may be based on a profile of the customer receiving the video stream, based on the subject matter of the agent presentation, or be based on a combination of both the profile and the presentation subject matter. The initial location and placement of the automations 704, 706 708 may be changed in response to receiving feedback from the customer regarding the treatments.

An agent portion video 714 may be located on the video image screen as well along with optional textual or graphic information 712 that augments the video presentations. A slide show, closed-captioning, a transcript, graphs, or supporting documentation are all examples of the auxiliary information 712 that may be displayed. Finally, one or more call treatments may be added to the image of the video stream. Much like the placement and size of the automations, the one or more call treatments 710 may be customized based on a user or customer profile.

While the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a WebRTC browser, and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method of providing a video session from an agent of a contact center, comprising:
   initiating, by a contact center computer, an interactive video session to a customer computer, the interactive video session comprising a first video stream transmitted to the customer computer and the first video stream having an image size;
   inserting, by the contact center computer, an agent video portion within the first video stream, the agent video portion occupying a first part of the image size;
   providing, by the contact center computer, an agent computer with a script related to a subject of the interactive video session;
   inserting, by the contact center computer, an automation within the first video stream, the automation occupying a second part of the image size;
   receiving, by the contact center computer, input from the customer computer interacting with the automation; and
   based on the input, modifying, by the contact center computer, the script provided to the agent computer.

2. The method of claim 1, wherein the interactive video session comprises a second video stream received by the contact center computer from the customer computer.

3. The method of claim 1, comprising:
   receiving by the contact center computer a request from the customer computer for a callback.

4. The method of claim 1, comprising:
   selecting by the contact center computer a content of the automation based on the subject of the interactive video session.

5. The method of claim 1, comprising:
   determining by the contact center computer a previously stored profile associated with the customer computer.

6. The method of claim 5, comprising:
   selecting by the contact center computer a location of the automation within the first video stream based on the stored profile associated with the customer computer.

7. The method of claim 5, comprising:
   selecting by the contact center computer a size of the automation within the video stream based on the stored profile associated with the customer computer.

8. The method of claim 1, wherein the automation comprises a plurality of automations, each automation occupying a respective part of the image size.

9. The method of claim 1, comprising:
   receiving other input from the customer computer during the interactive video session; and
   modifying by the contact center computer a location or a size of the automation based on the other input.

10. The method of claim 1, wherein the interactive video session utilizes WebRTC.

11. A contact center system for providing a video session from an agent computer within the contact center, said system comprising:
    a contact system server comprising:
      a video stream mixer;
      a computer readable storage medium storing executable instructions;
      a processor in communication with the computer readable storage medium, the processor when executing the executable instructions:
        initiates an interactive video session to a customer computer, the interactive video session comprising a first video stream transmitted to the customer computer and the first video stream having an image size;
        inserts via the video stream mixer an agent video portion within the first video stream, the agent video portion occupying a first part of the image size;
        provides an agent computer with a script related to a subject of the interactive video session;
        inserts via the video stream mixer an automation within the first video stream; the automation occupying a second part of the image size;
        receives input from the customer computer interacting with the automation; and
        modifies the script provided to the agent computer based on the input.

12. The system of claim 11, wherein the interactive video session comprises a second video stream received by the contact center server from the customer computer.

13. The system of claim 11, wherein the contact center receives a request from the customer computer for a callback.

14. The system of claim 11, wherein the processor when executing the executable instructions:
    selects a content of the automation based on the subject of the interactive video session.

15. The system of claim 11, wherein the processor when executing the executable instructions:
    determines a previously stored profile associated with the customer computer.

16. The system of claim 15, wherein the processor when executing the executable instructions:
    selects a location of the automation within the first video stream based on the stored profile associated with the customer computer.

17. The system of claim 15, wherein the processor when executing the executable instructions:

selects a size of the automation within the video stream based on the stored profile associated with the customer computer.

18. The system of claim 11, wherein the automation comprises a plurality of automations, each automation occupying a respective part of the image size.

19. The system of claim 11, wherein the interactive video session utilizes WebRTC.

20. A contact center system for providing a video session from an agent computer within the contact center, said system comprising:
   a first storage device storing a first database comprising a plurality of profiles, each profile associated with a respective customer computer;
   a second storage device storing a second database comprising a plurality of automations; each automation comprising an interactive video experience embeddable into a video stream;
   the agent computer, wherein the agent computer comprises:
      a video stream transmitter that transmits an agent video stream; and
      a display that displays an agent script;
   a contact system server comprising:
      a video stream mixer;
      a computer readable storage medium storing executable instructions;
      a processor in communication with the computer readable storage medium, the processor when executing the executable instructions:
         receives the agent video stream from the agent computer;
         initiates an interactive video session to a customer computer, the interactive video session comprising a first video stream transmitted to the customer computer and the first video stream having an image size;
         inserts via the video stream mixer an agent video portion within the first video stream, the agent video portion comprising the received agent video stream and the agent video portion occupying a first part of the image size;
         transmits to the agent computer the agent script, wherein contents of the agent script are related to a subject of the interactive video session;
         determines a particular one profile from the first database associated with the customer computer;
         selects an automation from the second database based on at least one of the particular one profile or the subject of the interactive video session;
         inserts via the video stream mixer the automation within the first video stream; the automation occupying a second part of the image size;
         receives input from the customer computer interacting with the automation; and
         modifies the agent script transmitted to the agent computer based on the input; and
   a network medium interconnecting the agent computer, the contact center server, the first storage device and the second storage device.

* * * * *